United States Patent Office 3,354,190
Patented Nov. 21, 1967

3,354,190
MAGNESIUM AND TIN DERIVATIVES OF FUSED-RING HYDROCARBONS AND THE PREPARATION THEREOF
Hugh E. Ramsden, Scotch Plains, N.J., assignor to Esso Research and Engineering Company, a corporation of Delaware
No Drawing. Filed Jan. 4, 1965, Ser. No. 423,348
13 Claims. (Cl. 260—429.7)

The present invention relates to certain novel organomagnesium compounds and to a novel method for preparing them.

Organomagnesium halides have long been known and used as the conventional Grignard reagents. It is a generally accepted fact that Grignard reagents are suitable for use in laboratory preparations of organometallic compounds but are regarded as far too expensive for use in commercial operations.

It has also been proposed to prepare halogen-free organomagnesium compounds by the reaction of magnesium metal or magnesium hydride with a number of hydrocarbon materials. For example, Barber U.S. Patents 2,788,377, issued Apr. 9, 1957 and 2,933,537, issued Apr. 19, 1960 disclose the preparation of bis(cyclopentadienyl) magnesium or mixtures of bis(cyclopentadienyl) magnesium and bis(methyl-, or lower alkyl cyclopentadienyl) magnesium by direct reaction of cyclopentadiene or methyl cyclopentadiene with metallic magnesium at temperatures of at least 450° C. and ranging up to as high as 1000° C. This reaction occurs because of the highly acidic character of the hydrogens of cyclopentadiene. The equation for this reaction is as follows:

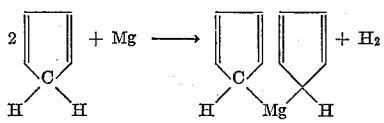

U.S. Patent No. 2,959,625, issued Nov. 8, 1960 to Blitzer et al. and U.S. Patent No. 2,985,692, issued May 23, 1961 to Podall disclose the preparation of alkyl magnesium compounds by reacting an olefin hydrocarbon with magnesium hydride in a reaction medium and in the presence of a catalyst. The equation for this reaction using ethylene as the olefin hydrocarbon is as follows:

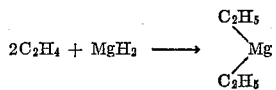

It has now been found that halogen-free organomagnesium compounds can be prepared by reacting metallic magnesium with certain aromatic hydrocarbons containing at least three condensed rings and at least one internal quinonoid linkage such as anthracene, naphthacene and the like. In a less preferred embodiment any $C_{12}$–$C_{40}$, preferably $C_{12}$–$C_{30}$ condensed ring aromatic hydrocarbon may be used.

In this reaction, the magnesium adds to the aromatic hydrocarbon without displacing hydrogen as in the case of reaction of magnesium with cyclopentadiene or the addition of hydrogen as in the case of the reaction of olefins with magnesium hydride. The reaction with anthracene involves the addition of one gram mol of the hydrocarbon, the magnesium adding or forming a bridge at the meso or 9, 10 positions according to the following equation:

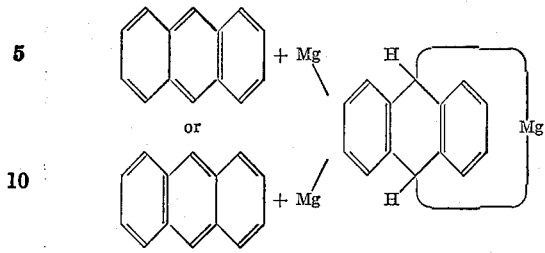

Magnesium anthracene is prepared readily by reaction of activated magnesium metal with pure or impure anthracene. The reaction requires about 24 hours of reflux to go to complete dissolution of the magnesium and appears to be somewhat sensitive to catalysts and to the solvents used. Higher boiling solvents seem to enhance the rate of reaction.

Moderately soluble in the solvent, tetrahydrofuran, the magnesium anthracene is usually obtained as a solid suspended in the soluent. It is moderately active as a Grignard, reacting with air and moisture. Since these condensed ring aromatic-magnesium adducts are obtained directly from magnesium metal and these aromatic hydrocarbons with no expensive alkyl halide intermediates, these should be among the cheapest Grignard reagents.

The condensed ring aromatic hydrocarbons which can form adducts with magnesium metal in accordance with the present invention are preferably anthracene; linear benzenoid derivatives of anthracene including naphthacene, pentacene, hexacene and heptacene; substituted anthracenes such as rubrene; and pyrene. Other benzologs or anthracene such as phenanthrene and chrysene may also be used to form adducts with magnesium. However, they are not overly reactive.

The reaction of the foregoing condensed ring aromatics with magnesium can be accelerated by violently agitating the reaction mixture, reducing the size of the metallic magnesium particles, i.e. using turnings, pellets, granules or even powdered magnesium. The magnesium may be activated as by treatment with a small amount of ethylene dibromide, ethyl bromide, other preferably $C_1$–$C_{10}$ alkyl halides or sulfates, iodine, etc. The amount of magnesium used in the process can vary considerably but is, in a preferred embodiment, about one gram atom per mole of aromatic hydrocarbon due to the 1:1 stoichiometry shown in the above equation.

The reaction is effected in the presence of a solvent or reaction medium such as high boiling, e.g. above 100° C. mononuclear aromatic hydrocarbons, e.g. benzene, toluene, xylene, mesitylene, diethyl benzenes, cumenes, etc., high boiling, e.g. above 60° C. ethers and polyethers, e.g. n-butyl ether, mixed alkyl aryl ethers (e.g. anisole), diethyl carbitol, and high boiling saturated paraffinic hydrocarbons e.g. isooctane, n-octane, kerosene, mineral spirits.

The preferred medium in which to carry out the present invention is one comprising a $C_4$ to $C_{20}$, preferably a $C_4$ to $C_{12}$ saturated cyclic ether such as tetrahydrofuran, tetrahydropyran and the lower alkyl or lower alkoxy derivatives thereof, e.g. methyl tetrahydrofuran, ethyl tetrahydropyran, ethoxy tetrahydrofuran, methoxytetrahydropyran and the like. The dialkyl ethers of alkylene and polyalkylene glycols having lower alkyl groups, i.e. $C_1$ to $C_6$, such as the dimethyl, methyl ethyl, diethyl, ethyl propyl, methyl butyl, etc. ethers of ethylene, diethylene, triethylene, tetraethylene and propylene glycols are also especially suitable as reaction media. Inert liquids such as the above-described hydrocarbons and alkyl ethers can be used in conjunction with these preferred cyclic and alkylene and polyalkylene glycol ethers and, of course, will form a part of the reaction medium when dispersions of magnesium hydrocarbons and/or alkyl ethers are employed. When the cyclic, alkylene- or polyalkylene glycol ethers are used in conjunction with another solvent, it is preferred to have the cyclic, alkylene- or polyalkylene glycol ether present in an amount of from 0.25 to 2 or more mols per gram atom of magnesium.

The condensed ring aromatic hydrocarbons such as anthracene, naphthacene and the like react with the magnesium to form the desired adducts at temperatures ranging from 20° C. to 170° C. It is generally preferred to add the magnesium and, if desired, a small amount of a suitable activator such as ethylene bromide and a few milliliters of the reaction medium to the reaction vessel. A small amount of the aromatic hydrocarbon reactant dissolved in the reaction medium is then added and the reaction mixture gradually heated to initiate the reaction, whereupon further amounts of the aromatic hydrocarbon are added. The reaction mixture is finally heated at reflux temperature, e.g. about 65 to 170° C. for a period of hours, e.g. about 8 to 48 hours to complete the reaction. It is desirable to subject the reaction mixture to vigorous agitation. Since the magnesium-condensed ring aromatics adducts are sensitive to moisture and oxidation, it is highly desirable to carry out the process under anhydrous conditions and to blanket the reaction mixture with an inert gas such as nitrogen.

The magnesium-condensed ring aromatics 1:1 adducts are isolated as such by filtration, crystallization, or evaporation or may be converted to other useful products directly. The magnesium anthracene 1:1 adduct, a new Grignard reagent, is obtained as a brown to orange solid and as a green solution in tetrahydrofuran solvent. It is reactive as a Grignard but somewhat milder than the more usual sodium adduct of anthracene. The magnesium pyrene 1:1 adduct is obtained as a deep mahogany-red viscous solution in tetrahydrofuran solvent and the magnesium chrysene 1:1 adduct as a deep blue-green solution in tetrahydrofuran.

The condensed ring aromatic-magnesium adducts prepared in accordance with the present invention can be reacted with metal salts or organometallic salts to form new organotin compounds, new organosilicon and silicanes, new organolead and organomolybedenum compounds, new phosphines, boranes, organoantimony, mercurials.

In addition to those reactions specifically mentioned the condensed ring aromatics-magnesium adducts may be reacted with any of the many other reactants normally associated with Grignard chemistry such as oxygen, alkylene oxides, aldehydes and ketones, sulfur, sulfur dioxide, sulfur trioxide, thionyl chloride, dialkyl sulfates, cyanogen chloride, haloamines, esters, anhydrides and the like. In this way, a wide variety of useful products can be prepared from the original aromatic hydrocarbons.

The following examples will further serve to illustrate the present invention.

*Example 1A.—Anthracenemagnesium*

To 0.5 gram atom (12.2 g.) of magnesium turnings activated by 2 ml. of butyl chloride and 3 ml. of tetrahydrofuran was added slowly a slurry of 0.25 mole (44.5 g.) of anthracene in 300 ml. of tetrahydrofuran. The mixture was heated to reflux. After 1 hour 20 minutes at reflux, a magnetic stirrer was introduced, and 2 ml. of methyl iodide was added. Forty minutes later 0.25 mole of anthracene in 300 ml. of tetrahydrofuran was added. Reflux and stirring was continued for 16 hours 50 minutes and stirring alone for 21 hours further with shutdown at night and start-up in the morning. The mixture was a black green solution with green crystals on the top interior of the flask and brown orange crystals on the sides. The magnesium had completely dissolved (determined since upon turning off the stirrer no magnesium was observed to settle to the bottom—magnesium due to its greater density settles immediatedly before the magnesium anthracene crystals). This example demonstrates that the adduct contains at least 1 gram atom of Mg per mole of anthracene.

*Example 1B*

To the magnesium anthracene of Example 1A was slowly added a solution of 0.5 mole (151.5 g.) of dibutyltin dichloride in 100 ml. of tetrahydrofuran. As the addition continued the temperature of the reaction mixture rose mildly and its viscosity increased. Color changes were as follows: As the dichloride went in the deep blue green color of the solution discharged to a whitish caste. When the addition was stopped for a few mniutes, additional orange-brown magnesium anthracene crystals dissolved giving back the deep blue-green solution. After 2½ hours of addition heat was applied and the temperature rose to 55° C. gradually over the time 2 hours 15 minutes required for the remainder of the addition. The mixture was then refluxed for 2 hrs. cooled overnight, 100 ml. of water was added and the reaction mixture was stirred for 1 hour, and then filtered. A crystal layer and a filtrate of an organic layer and an aqueous layer were obtained. Separation and work-up of the various crystals and the organic layer by fractional crystallizations led to recovery of some anthracene and several organotin fractions. One of these weighed 28.3 grams. It melted over a range (220–234° C.) resolidified at 235° C. to a polymer. Tin content determined by analysis was 27.3% compared to 28.9% theory for butyltin anthracene ($Bu_2SnAn$). The tin content of the other organotin fractions was below 28.9%. The melting behavior is identical to known samples. The equation for the reaction of this example is as follows:

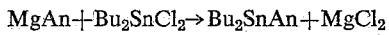
$$MgAn + Bu_2SnCl_2 \rightarrow Bu_2SnAn + MgCl_2$$

This example demonstrates, since butyl tin anthracene is known to have the 9, 10 structure, that magnesium anthracene should also have the same structure. This example also demonstrates that the adduct is a 1:1 (Mg:An) adduct since if the adduct were a mixture of e.g. 1:1 and 2:1 the melting characteristics of the product would not be that known for butyl tin anthracene, and the tin content of the product would be higher than theoretical because of the decreased anthracene present (referring to the above equation a second Mg atom would afford another coupling site on the anthracene rings). This example also demonstrates that no addition or substraction of hydrogen atoms occurred in the prepartion of the Mg Grignard.

*Example 2*

To 0.25 gram atom of 70–80 mesh magnesium powder activated by 1 ml. of ethyl bromide in 3 ml. of tetrahydrofuran was added 0.25 mole of anthracene in 250 ml. of tetrahydrofuran slurry. This reaction was stirred for 19 hours and 40 minutes at which time all of the magnesium was dissolved and the brown-orange solids with a deep green-black color had resulted.

*Example 3*

Example 2 was repeated except a 20 mesh magnesium powder was used and heating to reflux was also used. This reaction was started at about the same time as Example 2 and required about 3 hours longer to be completed.

*Example 4*

A preparation of magnesium anthracene was made by stirring 0.5 gram atoms of magnesium Grignard turnings, 0.5 mole anthracene, and 400 ml. of tetrahydrofuran (THF) for 8 days at room temperature. The solution was diluted with THF and decanted into a volumetric flask. The residual magnesium was washed with THF and the washings were added to the solution. Finally, it was diluted to 2000 ml. with THF. A deep green solution with a sticky orange precipitate resulted. This was shaken well and a sample titarated. It gave a yield of 48% (0.25 equivalent). The solubility of the anthracene-magnesium in tetrahydrofuran at room temperature is 0.516 milliequivalent per ml. or 0.104 gram per ml. The solution gave a strongly positive Gilman Color Test I.

The magnesium-anthracene does not fluoresce to ultraviolet light.

Example 5

To the product of Example 3 was added with stirring a solution of 0.25 mole (67.8 g.) of mercuric chloride in 150 ml. of tetrahydrofuran. The temperature of addition was kept at 40–45° C. or below and was regulated by the rate of addition. Stirring was continued for 2 hours. The mixture was let stand overnight. Then 100 ml. of water was added over a period of 3 hours. The mixture was filtered to yield a mass of dark grey crystals which fluoresced brilliant crimson to the ultraviolet black lamp. The crystals were washed several times with water and hot benzene. They weighed 72.3 grams. They were insoluble in ordinary solvents.

*Analysis.*—Mercury, theory, 53.0%. Found 53.3%.

Example 6

By the process of Example 3, pyrene (0.25 mole) was reacted with 70–80 mesh magnesium (0.25 g. atoms) in 250 ml. of tetrahydrofuran (as solvent for the pyrene) to yield a deep mahogany red viscous solution.

Example 7

By the process of Example 6 chrysene (0.1 mole), 70–80 mesh magnesium (0.1 gram atom), and 250 ml. tetrahydrofuran yielded a deep blue-green solution. Initiation was difficult with chrysene; it was necessary to initiate several times.

Example 8.—Mixed isoprene-anthracene Grignard

To one gram atom (24.3 g.) of magnesium turnings initiated by 2 ml. of ethylene bromide and 3 ml. tetrahydrofuran (THR) was added a slurry of one mole of anthracene and one mole of isoprene in 500 ml. of THF. This was heated at reflux for 5⅓ hours where (the temperature rose 61–67° C.) the solution became very viscous. Then 200 ml. of THF was added. Nearly all of the magnesium had reacted. Stirring was continued overnight.

Example 9.—Isoprene anthracene dibutyltin

To the Grignard of Example 8 was added 200 ml. of benzene to thin it. Then a solution of one mole (303.7 g.) of dibutyltin dichloride in 100 ml. of benzene was slowly added over a period of 5½ hours. Water, 200 ml., then dilute hydrochloric acid (100 ml. $H_2O$ containing 10 ml. of concentrated HCl), then 60 ml. of 6 N HCl were added. The solutions were separated. The organic layer deposited crystals and was filtered several times to yield three crops of crystals and a large amount of a viscous oil. The oil weighed 513.4 grams and analyzed 19.6% Sn (vs. 24.7 theory for anthracene isoprenedibutyltin) and 3.6% chlorine (vs. 0.0% for complete reaction). One of the crystalline derivatives analyzed 26.1% Sn and 6.2% chlorine was a molecular weight (Thermistor Vapor Phase Osmometer) of 596.

Example 9

Anthracene (0.25 mole), magnesium turnings (0.25 gram atom), activated by 2 ml. of ethyl bromide plus 3 ml. THF, were stirred in 250 ml. of the dimethyl ether of diethylene glycol for 1 hour. A deep blue green color developed. The mixture was heated over a period of 2 hours to 83° C. and over a period of 3 hours to 91° C. It was then cooled overnight and heated for 7½ hours the next day at 120° C. to 134° C., at the end of which time the magnesium had dissolved.

Example 10

In another reaction identical to Example 9 but without the initiation the mixture was heated for 56 hours at 120–130° C. without any reaction at all.

Example 11

In a process as in Example 9 but using the diethyl ether of diethylene glycol (DEEDG), it was necessary to heat the mixture to 170° C. before reaction commenced. Apparently there was inhibitors present in the DEEDG which had to be destroyed. The reaction went to completion.

Example 12

In a process identical to Example 11, but without use of initiation, no reaction occurred after 56 hours of heating at 120–170° C.

The foregoing specification contains a limited number of embodiments of the present invention. It will be understood that this invention is not limited thereto since numerous variations will readily occur to those skilled in this art without departing from the scope of this invention.

What is claimed is:

1. An adduct of magnesium with a $C_{12}$ to $C_{40}$ condensed ring aromatic hydrocarbon.
2. The compound of claim 1 in which the ratio of aromatic hydrocarbon to magnesium is 1:1.
3. Anthracene magnesium.
4. Pyrene magnesium.
5. Chrysene magnesium.
6. Isoprene anthracene magnesium.
7. Isoprene anthracene dibutyltin.
8. The process for preparing organomagnesium compounds which comprises maintaining magnesium metal in contact with a $C_{12}$ to $C_{40}$ condensed ring aromatic hydrocarbon for a period sufficient to form an adduct of magnesium with the said condensed ring aromatic hydrocarbon.
9. The process of claim 8 in which the reaction is carried out in the presence of a solvent selected from the group consisting of high-boiling nononuclear aromatic hydrocarbons, ethers and paraffinic hydrocarbons.
10. The process of claim 8 in which the reaction is carried out in the presence of a $C_4$ to $C_{20}$ saturated cyclic ether.
11. The process of claim 10 in which the saturated cyclic ether is an ethoxy ether.
12. The process of claim 8 in which the reaction is carried out at temperatures of 20 to 170° C. for a period of 20 minutes to 48 hours.
13. The process of claim 10 in which the reaction is initiated with a Grignard activator and the reaction is carried out at temperatures of 20 to 170° C. for a period of 20 minutes to 48 hours.

References Cited

UNITED STATES PATENTS

| | | | |
|---|---|---|---|
| 2,999,889 | 9/1961 | Foster et al. | 260—665 |
| 3,168,582 | 2/1965 | Aufdermarsh | 260—665 |

OTHER REFERENCES

Mathias et al.: Faraday Society Transactions, vol. 58 (1962), pages 948 to 952.

TOBIAS E. LEVOW, *Primary Examiner.*

W. F. W. BELLAMY, *Assistant Examiner.*